(12) United States Patent
Ghodsi-Khameneh (10) Patent No.: US 10,158,267 B2
(45) Date of Patent: Dec. 18, 2018

(54) ELECTRONICALLY COMMUTATED MOTOR

(71) Applicant: EBM-PAPST ST. GEORGEN GMBH & CO. KG, St. Georgen (DE)

(72) Inventor: Hassan Ghodsi-Khameneh, Offenburg (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 347 days.

(21) Appl. No.: 14/902,554

(22) PCT Filed: Jun. 12, 2014

(86) PCT No.: PCT/EP2014/062289
§ 371 (c)(1),
(2) Date: Jan. 5, 2016

(87) PCT Pub. No.: WO2015/000672
PCT Pub. Date: Jan. 8, 2015

(65) Prior Publication Data
US 2016/0211714 A1   Jul. 21, 2016

(30) Foreign Application Priority Data
Jul. 3, 2013  (DE) ................ 10 2013 106 999

(51) Int. Cl.
*H02K 3/38* (2006.01)
*H02K 3/52* (2006.01)
*H02K 3/28* (2006.01)

(52) U.S. Cl.
CPC ............ *H02K 3/38* (2013.01); *H02K 3/28* (2013.01); *H02K 3/522* (2013.01)

(58) Field of Classification Search
CPC .. H02K 3/28; H02K 3/38; H02K 3/52; H02K 3/522
(Continued)

(56) References Cited

U.S. PATENT DOCUMENTS

| 6,356,003 B1 | 3/2002 | Fiorenza et al. ............. 310/239 |
| 6,936,942 B1 * | 8/2005 | Okazaki ............... B62D 5/0403 310/71 |

(Continued)

FOREIGN PATENT DOCUMENTS

| DE | 202005016915 U | 2/2006 |
| DE | 102009010475 A | 9/2009 |

(Continued)

*Primary Examiner* — Burton Mullins
(74) *Attorney, Agent, or Firm* — Dickinson Wright PLLC (57) ABSTRACT

An electronically commutated motor has a rotor with a permanent magnet arrangement, a stator (30) with a bundle of laminations (32) and a winding (34). The bundle of laminations is, at at least at one axial end (32'), provided with an insulator (41) and the winding (34) has a plurality of coils (38A, 38B, 38C, 38D) that are wound from at least one winding wire (36); at least one winding wire contact element (50) which is attached to an insulator body (41) and mechanically and electrically conductive connected with at least one section (36A) of at least one winding wire (36); at least one contact track (60) with a first section (61) which is mechanically and electrically conductive connected to the winding wire contact element (50), a second section (62) which is arranged with an internal threaded part (65) with an internal thread (66) to enable an electrical connection of the winding (34) to the associated voltage source and a third section (63) which connects the first section (61) with the second section (62) electrically conductive.

13 Claims, 8 Drawing Sheets

(58) Field of Classification Search
USPC .......................................................... 310/71
See application file for complete search history.

(56) References Cited

U.S. PATENT DOCUMENTS

| | | | | |
|---|---|---|---|---|
| 7,861,407 | B2 * | 1/2011 | Sakata | ................... H02K 3/522 |
| | | | | 29/830 |
| 8,022,592 | B2 * | 9/2011 | Kaneiwa | ................. H02K 3/50 |
| | | | | 310/214 |
| 8,035,263 | B2 * | 10/2011 | Kienzler | ................ H02K 3/522 |
| | | | | 310/179 |
| 9,079,603 | B2 * | 7/2015 | Isshiki | ................. B62D 5/0403 |
| 2008/0175732 | A1 | 7/2008 | Sakata | ............................ 29/848 |
| 2014/0319939 | A1 * | 10/2014 | Yamada | ................. H02K 3/522 |
| | | | | 310/52 |

FOREIGN PATENT DOCUMENTS

| | | |
|---|---|---|
| DE | 102011107022 A | 4/2012 |
| EP | 194 774 A1 | 7/2008 |
| EP | 1947754 A1 | 7/2008 |

* cited by examiner

ELECTRONICALLY COMMUTATED MOTOR

The invention relates to an electronically commutated motor to which electric conductors of a contact arm that comprise a threaded part can be screwed. Those conductors are connected to an associated electrically conductive voltage source.

Such electronically commutated motors are, for example, used in transmissions of motor vehicles, especially in dual-clutch transmissions, in order to operate oil pumps, to lubricate and while shifting gears. Thus, the electronically commutated motor is contacted by a corresponding control device and thereby by a corresponding voltage source or power amplifier, over a contact arm of the control device which respectively is arranged in a predetermined angle to the motor. The contact arm is generally constructed of plastic and contains, in each case, electric conductors needed for electric contacting. These have associated threaded parts which, for example, can be screwed to respective winding connections of the electronically commutated motor whereby pulling forces can occur at the winding connections. After a respective screw connection, that is in installed condition of the motor, additionally pulling and pressing forces occur at the winding connections in the axial direction of the contact arm. This can lead to damaging the stator or to an interruption of the electrically conductive connection between the winding connections and the electric conductors of the contact arms.

It is therefore an object of the invention to provide a new electronically commutated motor with winding connections, with which it is possible to create an electrically conductive connection between the winding connections and the electrical conductors of a contact arm that contains a threaded part. Thereby pulling and/or pressing forces occurring at the winding connections at a corresponding assembly of, or an in installed state of, the motor are at least reduced.

This object is achieved by configuring an electronically commutated motor with a winding arrangement which is connected, via an internally threaded part, to a voltage source. Preferred embodiments are described below.

Further details and advantageous refinements of the invention are the results of the embodiments described and illustrated in the following description which by no means to be understood as a limitation of the invention. Shown are.

In the following description, the expression "left," "right," "top" and "bottom" refer to the respective drawing figure and, depending upon a respectively chosen direction (portrait or landscape), can vary from one drawing figure to the next. Identical or functionally-equivalent parts in the various figures are named with the same reference numerals, and are usually only described once.

Figure 1:
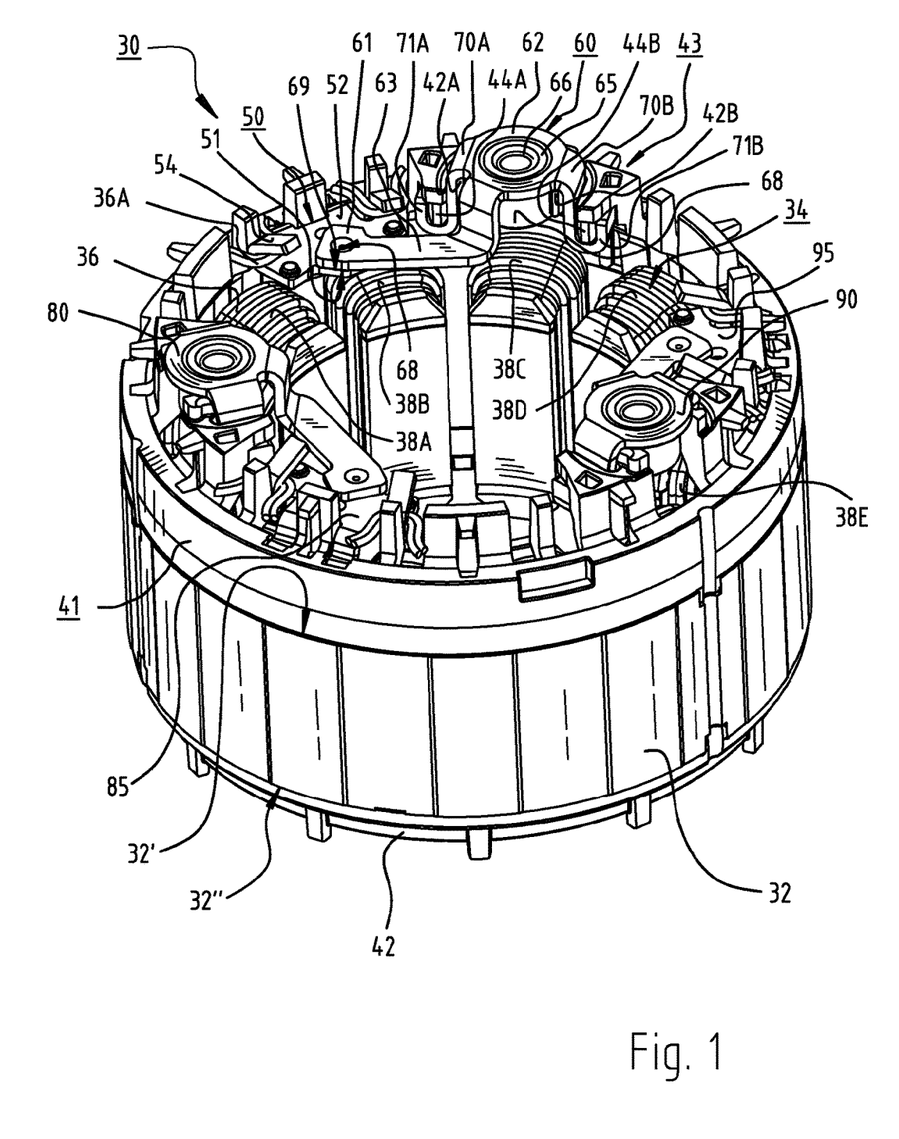
FIG. 1:
a perspective view of an external stator according to the invention, with an insulator body to which contact tracks and winding wire contact elements are arranged according to an embodiment.

FIG. 1 shows a stator 30 adapted for use in an electronically commutated motor (10 in FIG. 10) in accordance with one embodiment. This one is configured as an external stator adapted for use in an electronically commutated internal-rotor motor. However, it is to be noted that the present invention is not limited to external stators for internal-rotor motors, but rather can also find application in the context of internal stators for external-rotor motors.

The external stator 30 is preferably annularly shaped and preferably has a bundle or stack of laminations 32, equipped with a winding 34. The stack is composed of a plurality of lamella-like metal sheets. Alternatively, one can use, for example, a stator core composed of soft iron, instead of a lamella-like bundle of laminations 32.

That bundle of laminations 32 is preferably equipped, at a first (top) axial end 32' with a top insulator body 41 and at a second (bottom) axial end 32" with a bottom insulator body 42. The insulator bodies 41, 42 are preferably configured to match the type of end plates, in such way that they only cover the bundle of laminations 32 at the front faces at the axial ends 32' or 32". Hereby, the insulator bodies 41, 42 can be attached to the bundle of laminations 32, for example via locking in place, jamming, or any other suitable mounting method, or can be secured by a winding 34 to the bundle of laminations 32.

The winding 34 has a plurality of coils which are each arranged at salient stator poles of the bundle of laminations 32 which, in the configuration shown, is implemented with twelve poles. For simplicity and for clarity of illustration, only five out of the altogether twelve shown coils are shown here, exemplarily with the reference numerals 38A, 38B, 38C, 38D, 38E and arranged on respective stator poles of the external stator 30. The coils 38A, 38B, 38C, 38D, 38E are preferably wound, using at least one winding wire 36, around the respective stator poles and respective sections of the top and bottom insulator bodies 41 or 42.

It is to be noted that the external stator 30 is configured here merely exemplarily with twelve poles and not as a limitation of the invention. This can rather be applied to an external stator with an arbitrary count of stator poles, for example with an external stator with four, six, eight or more stator poles.

According to an embodiment, at the top insulator 41 of the external stator 30, one or more winding wire contact elements are arranged. Those serve for interconnection of provided coils of the winding 34 for formation of stator phases. For example, on top insulator body 41, three winding wire contact elements 50, 85, 95 are exemplarily arranged, which elements each interconnect four of the twelve coils of the winding 34 with each other, so that the external stator 30 corresponds illustratively to a twelve pole and three phase stator in a delta configuration. The winding wire contact elements 50, 85, 95 have, at least to within predetermined manufacturing tolerances, identical structures, so that hereinafter, for the sake of brevity and for simplicity of description, only the winding wire contact element 50 is described, representing all of winding wire contact elements 50, 85, 95.

The winding wire contact element 50 preferably comprises, at least in certain areas, copper, and is attached to the top insulator body 41, for example locked in place, jammed, adjusted, glued and/or welded. Alternatively to this, the winding wire contact element 50 can also merely be put onto the top insulator body 41 and can be secured in position by, among other methods, winding wire 36 around it. According to an embodiment, the winding wire contact element 50 is arranged in a first angular range of the external stator 30, which is illustratively arranged approximately centrally between coils 38A, 38B.

Preferably the winding wire contact element 50 has a base plate 52 and a flat winding wire contact element section 51. Based on the base plate 52, at least one and preferably two bridge elements extend with a given bend away from the base plate 52, of which here, for reasons of simplicity and clarity, only one bridge element with the reference numeral 54 is shown in the drawing.
Between the bridge element 54 and the base plate 52, there preferably is arranged at least one section 36A of at least one winding wire 36, so that the winding wire contact element 50 is mechanically and electrically conductively connected with at least one section 36A and thereby with at least one winding wire 36. Hereby, at least one section 36A is preferably arranged on the winding wire contact element 50 in such way that this one is secured by at least one winding wire 36 to the insulator body 41, especially for the case where the winding wire contact element is merely put onto the insulator 41.

According to one embodiment, the winding wire contact element 50 is mechanically and electrically conductively attached to an associated contact track 60 which at least has a first section 61, a second section 62 and a third section 63. The contact track 60 is preferably implemented as a bent part, especially as a stamped bent part and comprises copper, at least in a region thereof.

However, it is to be noted out that, due to the three-phase design of the external stator 30 shown in this embodiment, a further two contact tracks, designated with the reference numerals 80, 90 fin application; they are mechanically and electrically conductively connected with the winding wire contact elements 85 and 95. Since those contact tracks 80, 90, at least within given tolerances, have a similar construction as the one of contact track 60, hereinafter, for the sake of brevity and simplicity, only the contact track 60 will be described, as a representative example of all three contact tracks 60, 80, 90.

The first area 61 of the contact track 60 is mechanically and electrically conductive connected with the winding wire contact element 50. Hereby, the first area 61 has preferably at least one flat contact track section 69 which is flatly connected to the winding wire contact element section 51 of the winding wire contact element 50, for example via a welded or glued connection. The first section 61 is electrically conductively connected via the third section 63 to the second section 62.

The second section 62 of the contact track 60 has preferably at least one first partial section 70A, 70B which is/are secured, at the insulator body 41, to respective elastic retaining elements 42A or 42B of an associated holding device 43.

This first partial section 70A, 70B, in collaboration with insulator body 41, limits a movement of the second section 62 of the contact track 60 in a direction pointing toward the bundle of laminations 32, i.e. down, and is preferably connected with at least a second partial section 71A, 71B which preferably spreads away hook-shaped from the first partial section 70A, 70B. Illustratively, two diametrically opposing first partial sections 70A, 70B are provided, at the second section 62 and each of these partial sections 70A, 70B is connected to a corresponding partial section 71A or 71B, preferably formed onto this one or integrally formed therewith. Those second partial sections 71A, 71B are preferably secured to rigid holding elements 44A or 44B of the holding device 43 for the insulator body 41 and, together with insulator body 41, limit a movement of the second section 62 of the contact track 60 in a direction pointing away from the bundle of laminations 32, i.e. upward.

According to an embodiment, an internal threaded part 65 is arranged with an internal threaded part 66 at the second section 62. This shows a given gap from the coils 38A, 38B, 38C, 38D that are wound from at least one winding wire 36.

The internal threaded part 65 comprises, at least in part, steel, and is preferably implemented in two parts with the second section 62 and firmly connected to it, for example by locking in place, joined and/or welded to enable an electrical connection of an associated external voltage source to the contact track 60. For this purpose, the internal thread 66 of the internal threaded part 65 is axially aligned to enable the screwing on of a screw part i.e. of a threaded part of an electrical conductor of a contact arm of the associated external voltage source or of an external control device from axial direction; see FIG. 4. The screw part can hereby be provided by the buyer of the motor.

Preferably, the inner threaded part 65 has an outer surface or an outer circumference 68 which is being elastically held between the elastic holding elements 42A, 42B of the holding device 43. For this, the inner threaded part 66 is arranged with the second section 62 of the contact track 60 in a second angular range of the external stator 30, which illustratively is formed by the coil 38C and thus doesn't overlap with the above-described first angular range.

In connection with assembly of the external stator 30 into a motor enclosure of an electronically commutated motor (10 in FIG. 10) the contact tracks 60, 80, 90 preferably lie with their fronts facing away from the winding 34 against an associated enclosure wall. This enables an additional axial securing of position and a further reduction of pulling and/or pressing forces exerted upon contact tracks 60, 80, 90.

Figure 2:
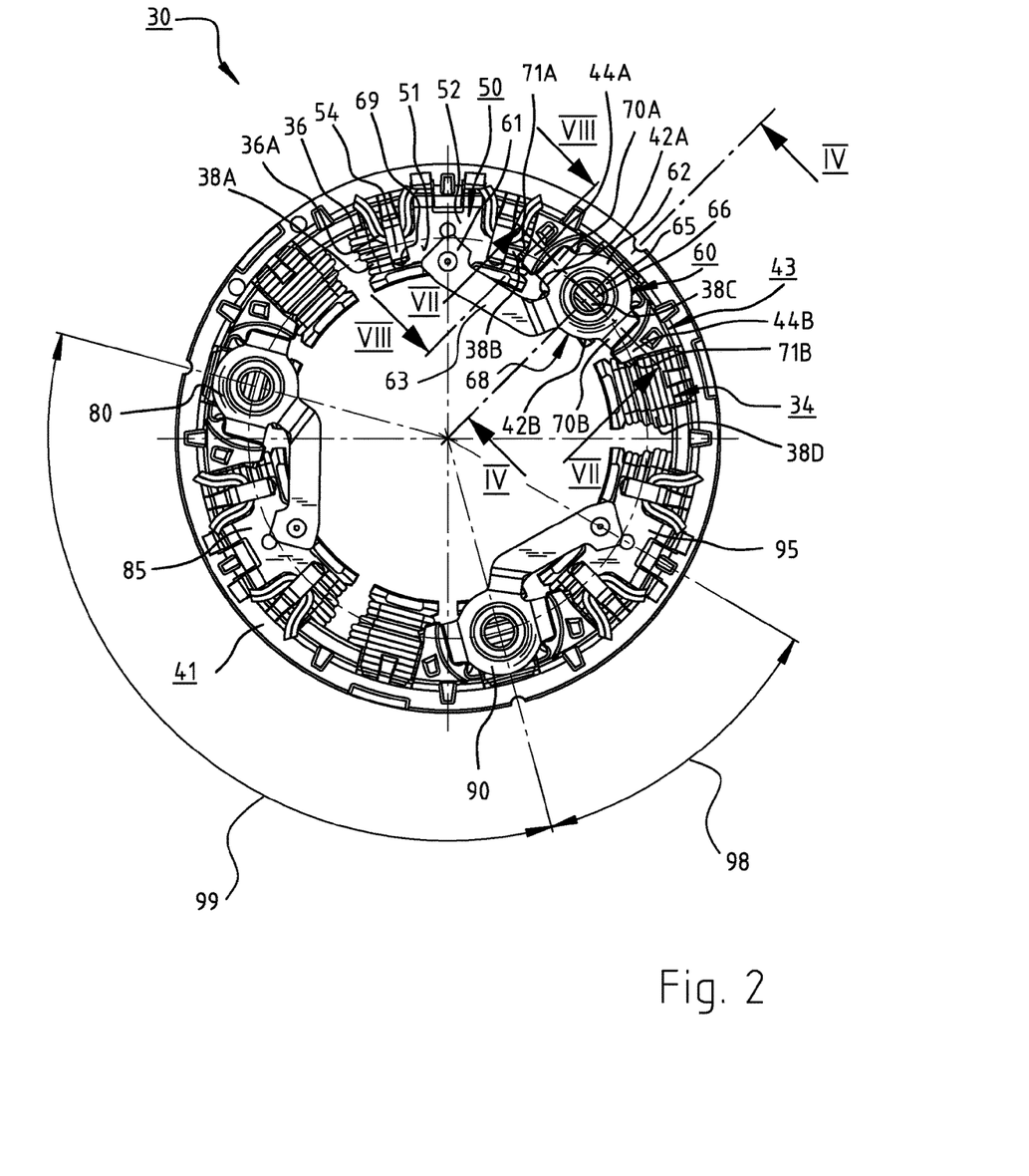
FIG. 2: a top view of the external stator from FIG. 1

FIG. 2 shows the external stator 30 of FIG. 1 with a preferable positioning of the contact tracks 60, 80, 90 as well as each associated winding wire contact elements 50, 85, 95 at the insulating body 41. This preferred position illustrates the arrangement of the contact tracks 60, 80, 90 and the winding wire contact elements 50, 85, 95 in respective non-overlapping angular ranges, offset with respect to one another.

According to an embodiment, the second sections 62 of the contact tracks 60, 80, 90 are arranged with respect to one another with the threaded parts 65, mutually offset by a mechanical angle of 120°, as illustrated for example by the indicated angle offset 99 between the contact tracks 80, 90. The mechanically and electrically conductive connection of the second sections 62 of the contact tracks 60, 80, 90 with the associated winding wire contact elements 50, 85, 95 occurs, as described above, via the third sections 63 that are connected with the first sections 61 of the contact tracks 60, 80, 90. Those serve additionally as hold-down clamps of the winding wire contact elements 50, 85, 95 at the insulating body 41.

The winding wire contact elements 50, 85, 95 are each arranged offset by a mechanical angle of approximately 40°, i.e. counter-clockwise, starting from the associated contact tracks 60, 80 or 90 at the isolating body 41 as illustrated, for example, by an indicated angle 98 between the contact tracks 90 and the winding wire contact element 95. Thus, each of the winding wire contact elements 50, 85, 95 are also offset to each other by a mechanical angle of 120°.

Figure 3:
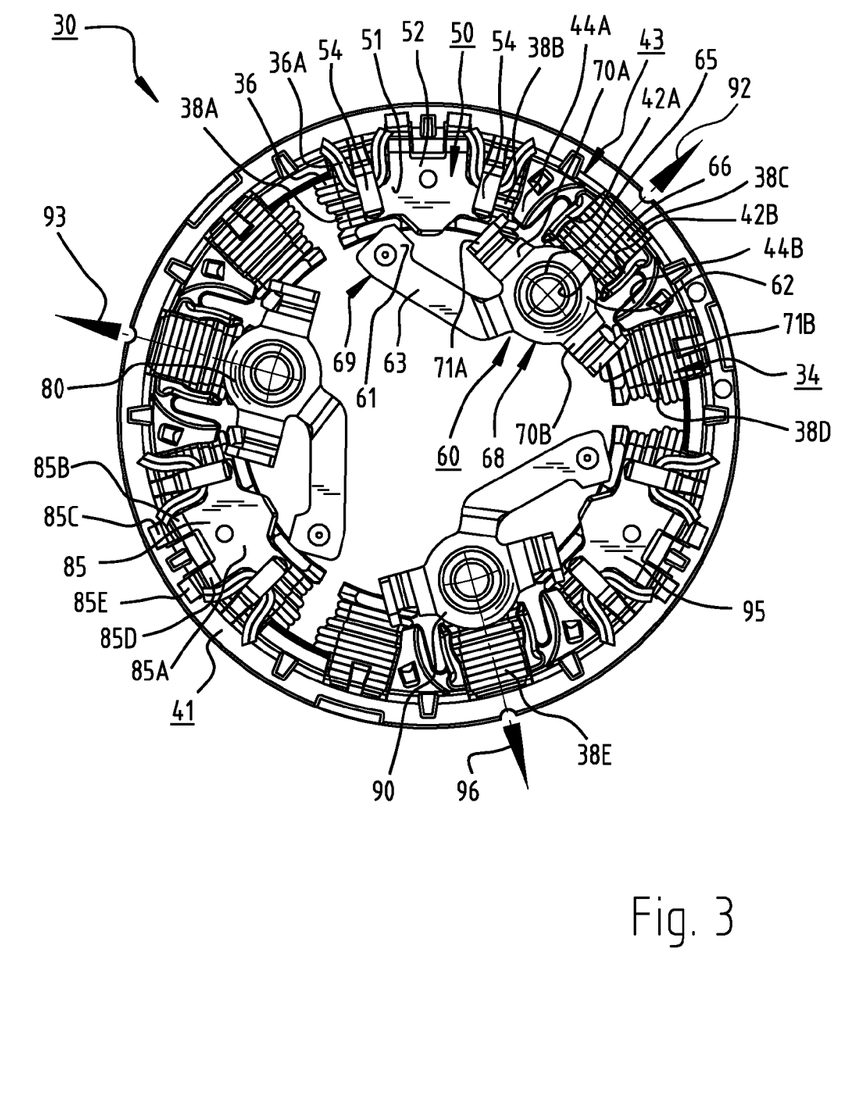
FIG. 3: a top view of the external stator from FIG. 1 and FIG. 2 according to an exemplary implementation of the contact tracks.

FIG. 3 shows the external stator 30 of FIG. 1 and FIG. 2 with the winding wire contact elements 50, 85, 95 secured to the insulating body 41 according to an exemplary implementation of the contact tracks 60, 80, 90. Moreover, FIG. 3 illustrates the structure of the winding wire contact elements 50 with the flat winding wire contact element section 51 and the base plate 52, from which the two bridge elements 54 spread away with the given bend.

According to an embodiment, the winding wire contact element 85 has a base plate 85A and two fixing pins 85B, 85D which form with the base plate 85A a U-shaped geometry. At each of the fixing pins 85B, 85D preferably a hook-shaped securing joint 85C or 85E is formed, which preferably is rectangularly angled from the associated fixing pins 85B or 85D. The fixing pins 85B, 85D and the fixing joints 85C, 85E serve for securing of the winding wire contact elements 85 at the insulating body 41. It is however to be noted that the winding wire contact elements 50, 95, as described above, have a consistent structure, at least within given tolerances, and thus also have corresponding fixing pins and fixing joints. Their description will however be skipped for the sake of brevity of description.

During assembly of the contact tracks 60, 80, 90 to the insulating body 41, those first will be radially arranged to the insulating body 41, in such a way that their second sections 62 are each pointed to an associated angle or assembly point area and their first sections 61 are each pointed to an associated winding wire contact element 50. Then, the contact tracks 60, 80, 90 are shoved radially upwards, onto the insulating body 41, as indicated by the arrows 92, 93, 96 and hereby secured to them, as described below, in connection with the example of contact track 60.

The contact track 60 is first arranged to the winding 34 as shown in the section of the coil 38C, whereas the partial sections 70A, 70B, 71A, 71B are aligned from their second section 62 at least approximately opposing the holding elements 42A, 42B, 44A, 44B of the holding device 43. Then, the partial sections 70A, 70B, 71A, 71B are shoved onto the holding elements 42A, 42B, 44A, 44B, so that the second section 62 locks into place at the holding device 43 and thus the contact track 60 is secured to the insulating body 41.

Figure 4:
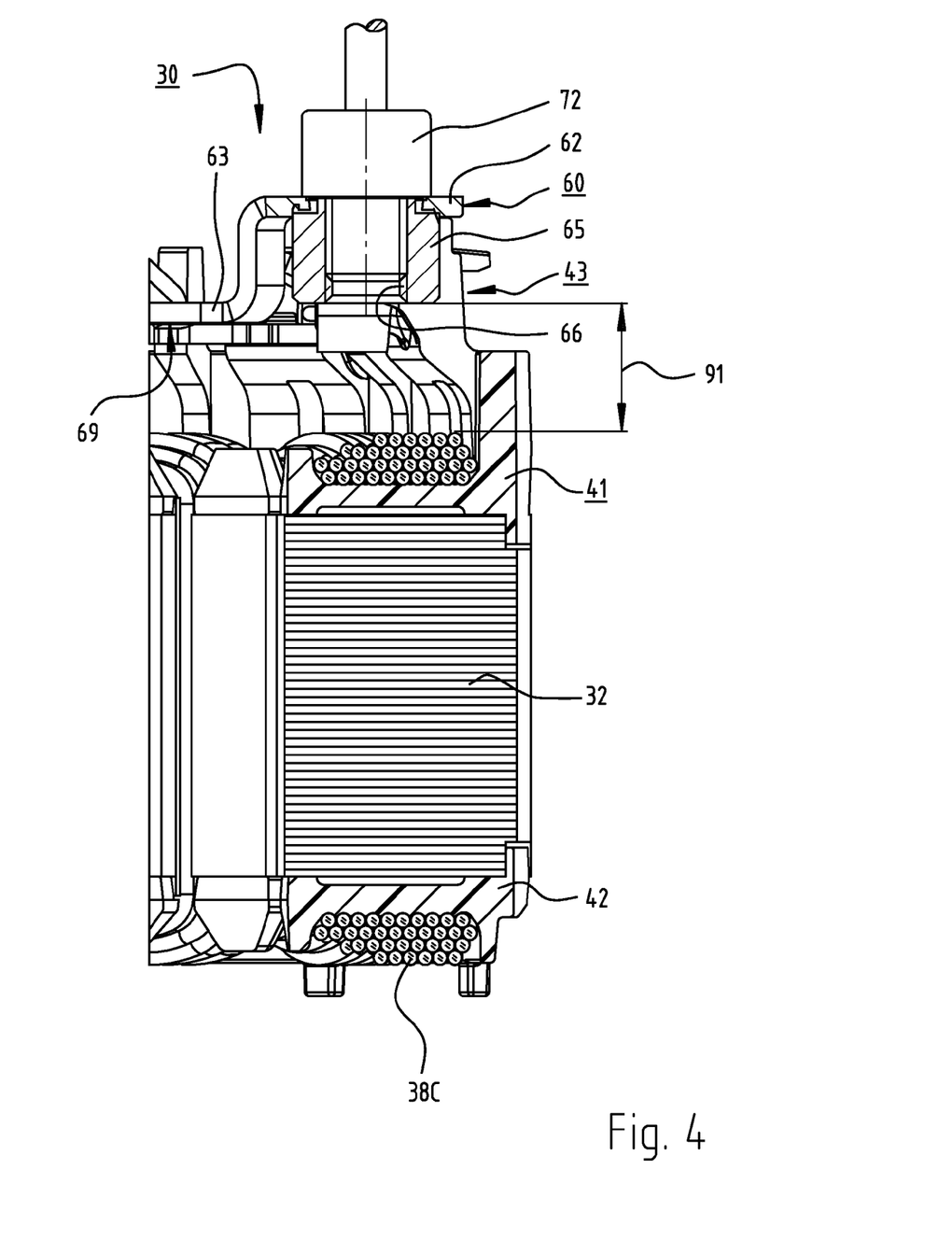
FIG. 4: an interface of the external stator of FIG. 1 and FIG. 2 looking in the direction of arrows IV of FIG. 2.

FIG. 4 shows the holding device 43 of the insulating body 41 of the external stator 30 of FIG. 1 and FIG. 2 fixed contact track 60 to illustrate a preferred gap 91 between this one and the coil 38C. This serves to prevent a short circuit between the coil 38C and the internal threaded part 65 of the contact track 60. A screw part 72 with an electrical conductor for electrical contact is schematically illustrated, and the screw part 72 is screwed into the internal thread 66.

Figure 5:
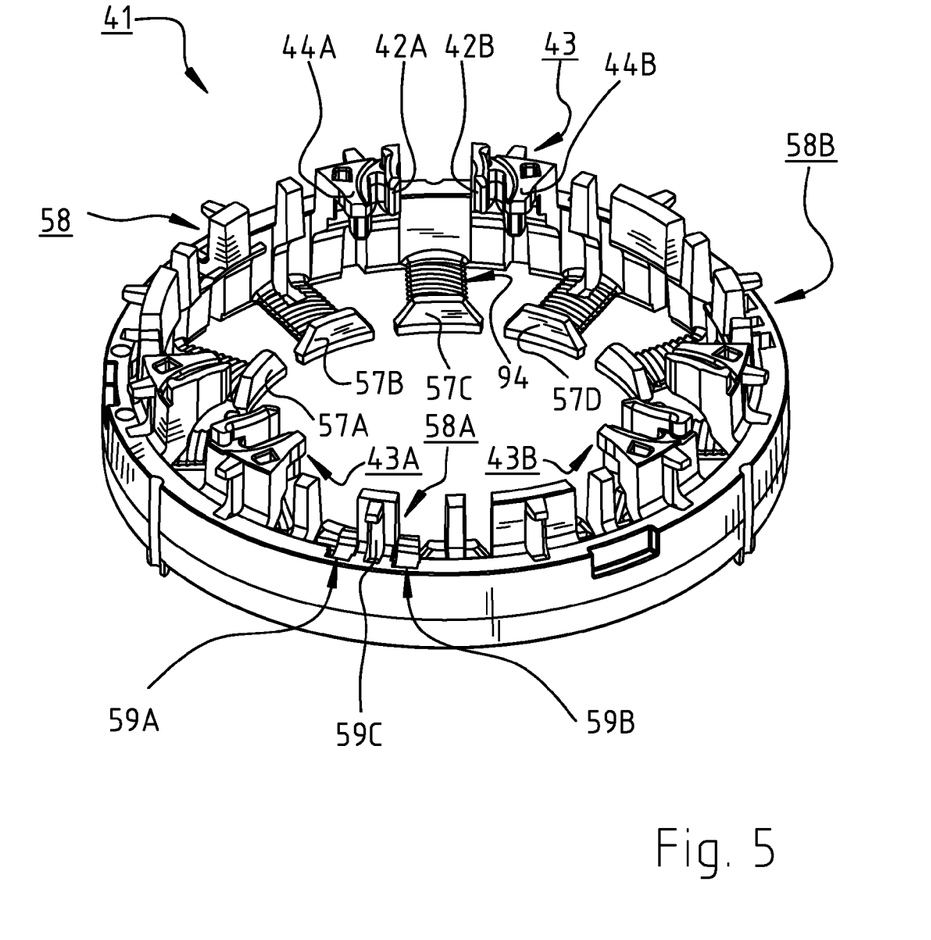
FIG. 5: a perspective view of the insulator from FIG. 1 and FIG. 2.

FIG. 5 shows the insulating body 41 of FIG. 1 to FIG. 4 to illustrate the holding device 43 with the flexible holding elements 42A, 42B and the rigid holding element 44A, 44B to fix the contact track 60 of FIG. 1 to FIG. 4. Moreover the insulating body 41 shows two more holding devices 43A, 43B to secure contact tracks 80, 90 of FIG. 1 to FIG. 4 as well as cap-like insulating joints, preferably equipped with poultice grooves, for insulation of the stator poles of the external stator 30 of FIG. 1 to FIG. 4. Exemplary four cap-like insulating joints are designated with the reference numerals 57A, 57B, 57C, 57D. The insulating joint 57C has exemplary poultice grooves marked with a reference numeral 94 to facilitate a respective winding of the coil 38C of FIG. 1 to FIG. 4.

To secure the winding wire contact elements 50, 85, 95 of FIG. 1 to FIG. 3 associated and preferably consistent securing devices 58, 58A, 58B, at least within given tolerances, are provided. In the following, only securing device 58A will be described, for reasons of brevity and simplicity. This one has two preferably pocket-shaped recesses 59A, 59B as well as a positioning pin 59C. The pocket-shaped recesses 59A, 59B serve to receive hook-shaped fixating joints 85C or 85E of the winding wire contact elements 85 of FIG. 3 whose fixating pins 85B, 85D laterally encompass the positioning pin 59C.

Figure 6:
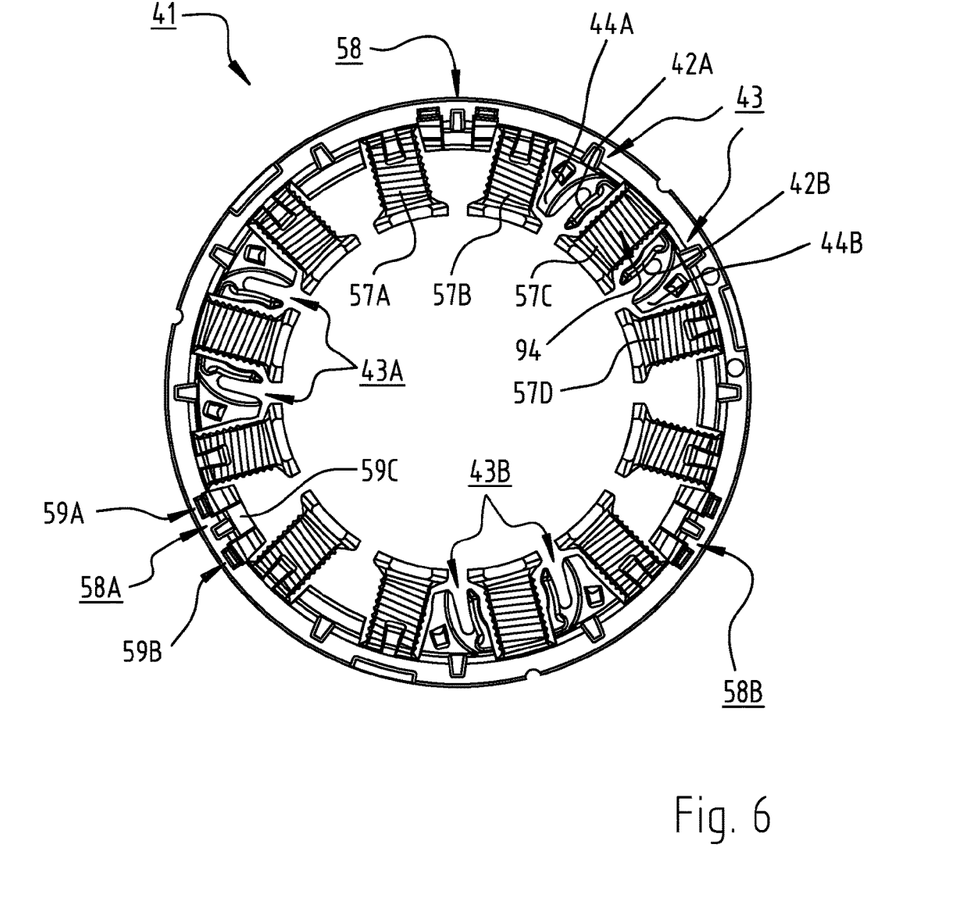
FIG. 6: a top view onto the insulator from FIG. 1 and FIG. 2.

FIG. 6 shows the insulating body 41 of FIG. 5 illustrating the poultice grooves 94, the pocket-shaped recesses 59A, 59B and the holding device 43.

Figure 7:
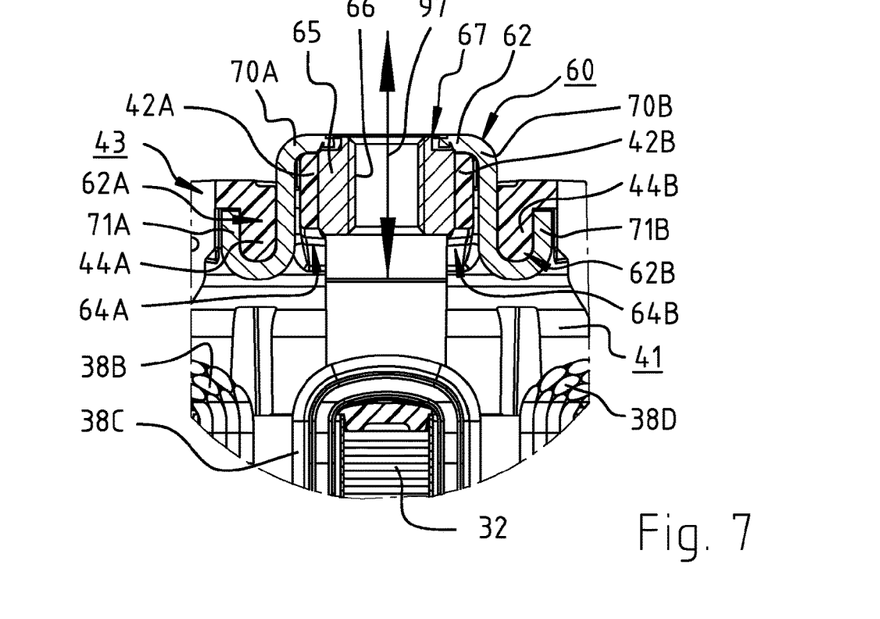
FIG. 7: a section of a portion of the external stator from FIG. 1 and FIG. 2 seen in direction of arrows VII from FIG. 2, FIG. 8: a sectional view of the external stator of FIG. 1 and FIG. 2, seen in direction of the arrows VIII of FIG. 2, FIG. 9: a perspective view of the contact track of FIG. 1 and FIG. 2.

FIG. 7 shows the contact track 60 which is secured to the holding device 43 of the insulating body 41 with the internal threaded part 65 preferably attached to the second section 62 and the partial sections 70A, 70B, 71A, 71B of FIG. 1 to FIG. 4 provided at the second section 62 via a press fit or a click-on connection 67. The partial sections 70A, 70B form first intake grooves 64A or 64B preferably with the external circumference (68 in FIG. 1) of the internal threaded part 65 for intake of the flexible holding elements 42A or 42B of the holding device 43. The partial sections 71A, 71B form second intake grooves 62A or 62B preferably with the partial sections 70A or 70B for intake of rigid holding elements 44A or 44B of the holding device 43.

According to an embodiment, the flexible holding elements 42A or 42B are taken into the first intake grooves 64A or 64B in such way that shifting of the contact track 60 in axial direction of the bundle of laminations 32 in direction of the coil 38C is prevented. Moreover, the rigid holding elements 44B or 44B are taken into the second intake grooves 62A or 62B in such way that a shifting of the contact track 60 in axial direction of the bundle of laminations 32 into a direction facing away from the coil 38C is also prevented. Thus, an axial shifting marked by an arrow 97 of the contact track secured to the insulating body 41, relative to the bundle of laminations 32, is prevented securely and reliably.

Figure 8:
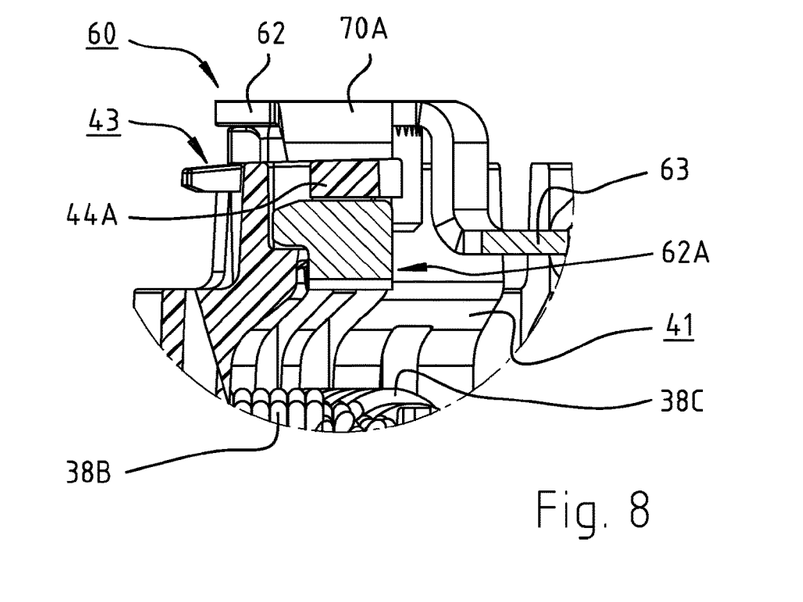

FIG. 8 shows the contact track 60 with the internal threaded part 65 of FIG. 7 secured to the holding device 43 of the insulating body 41 to illustrate the rigid holding elements 44A of the holding device 43 engaging in the intake groove 62A.

Figure 9:
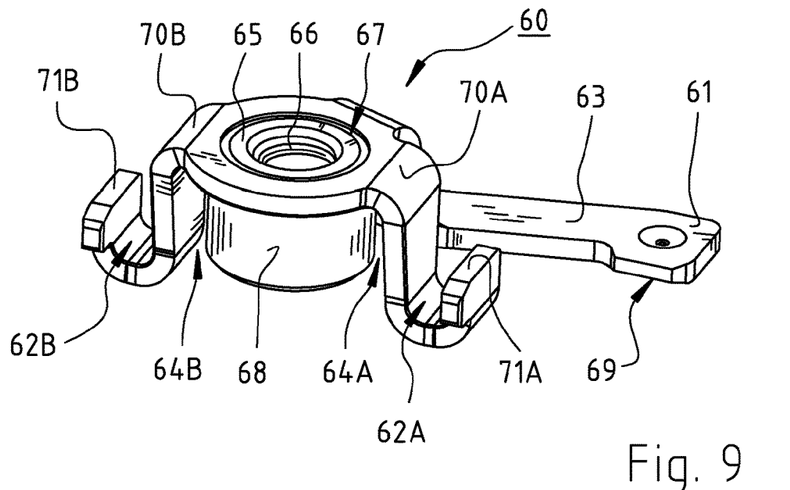

FIG. 9 shows the contact track 60 of FIG. 1 to FIG. 4 to illustrate the intake grooves 62A, 62B, 64A, 64B of FIG. 7.

Figure 10:
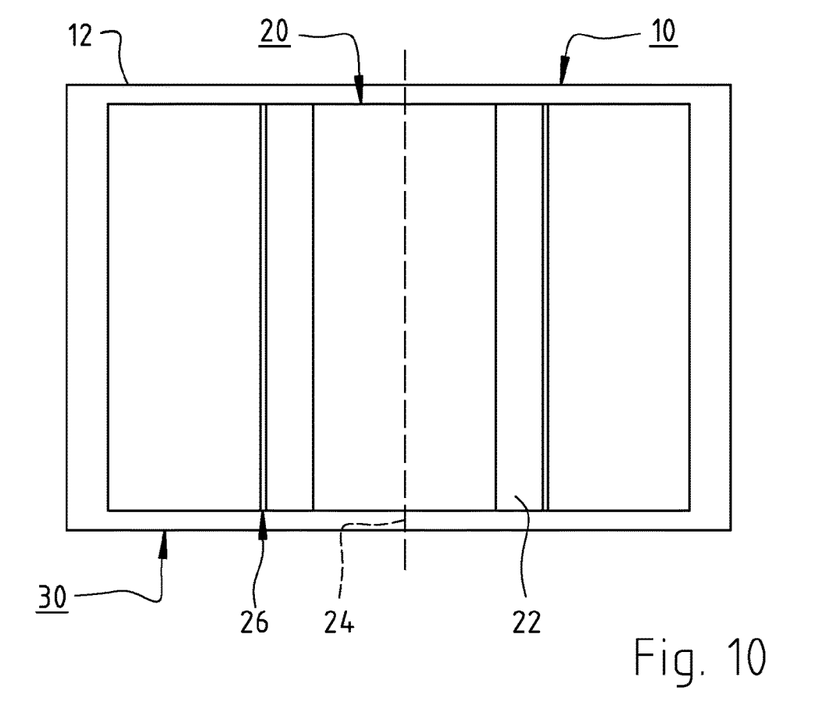
FIG. 10: a schematic view of an electronically commutated motor according to the invention, with the external stator of FIG. 1 and FIG. 2.

FIG. 10 shows, according to an embodiment of the type of an internal rotor motor, an electronically commutated motor 10 to which the external stator 30 of FIG. 1 to FIG. 4 is applied. The motor 10 has, in addition to the external stator 30, a rotor 20, formed in the type of an internal rotor, with a permanent magnet arrangement 22 which defines the rotary axis 24 of motor 10 for rotor 20.

The figures and the corresponding description illustrate an electronically commutated motor 10 which has:
A rotor 20 with a permanent magnet arrangement 22 which defines a rotary axis 24 of the motor 10 to rotor 20, a stator 30 with a bundle of laminations 32 and a winding 34 which equips the bundle of lamination 32 at least at one axial end 32' with an insulating body 41 and which winding comprises a majority of coils 38A, 38B, 38C, 38D wound from at least one winding wire 36, at least one winding wire contact element 50 which is fixed to the insulating body 41 and connected mechanically and electrically conducted at least one section 36A of at least one winding wire 36, at least one contact track 60 with a first section 61, a second section 62 and a third section 63 whereas the first section is mechanically and electrically conductive connected to the winding wire contact element 50 whereas the second section 62 an internal threaded part 65 are arranged to an internal thread 66, to enable an electric connection of the winding arrangement 34 to a corresponding voltage source, and wherein the third section 63 electrically conductive connects the first section 61 with the second section 62.

According to the preferred embodiment, the stator 30 is formed ring-shaped, the winding wire contact element 50 is arranged in a first angular range of the stator 30 and the internal threaded part 65 is arranged in a second angular range of the stator 30; the first angular range and the second angular range don't overlap. This facilitates assembly.

According to a preferred embodiment, the contact track 60 shows in the second section 62 at least one first partial section 70A, 70B which is secured to the insulating body 41 and in collaboration with isolating body 41, limits any movement of the second section 62 of the contact track 60 in a direction pointing to the bundle of laminations 32. This leads to higher precision and sturdiness during assembly.

According to a preferred embodiment, the contact track 60 has, in the second section 62, at least a second partial section 71A, 71B which is secured to the insulating body 41 and in collaboration with insulating body 41, limits a movement of the second section 62 of the contact track 60 into a direction pointing away from the bundle of laminations 32. This leads to a higher precision and sturdiness during assembly during manufacture, especially in collaboration with the partial area 70A, 70B.

According to a preferred embodiment, at least a first partial section 70A, 70B and at least a second partial section 71A, 71B are connected to each other. This increases the precision during assembly.

According to a preferred embodiment, the internal threaded part 65 shows an outer surface 68 and the insulating body 41 has at least one flexible holding element 42A, 42B which is formed in order to hold the internal threaded part 65 flexibly attached to its outer surface. Hereby, the position of the flexible holding elements is exactly determined and this facilitates the screwing on of a contact.

According to a preferred embodiment, the winding wire contact element 50 has a flat winding wire contact element section 51 and the first section 61 of the contact track 60 has a flat contact track section 69 while the winding wire contact element section 51 and the contact track section 69 are connected flatly to each other preferably via a welding connection. This results in a good and low-resistance connection and facilitates process-reliable contacting.

According to a preferred embodiment, the contact track 60 comprises copper. Copper conducts well and is ductile. This has proved very positive for the forming of contact track 60.

According to a preferred embodiment, the winding wire contact element 50 contains copper. This is especially advantageous for forming a stamped bent part.

According to a preferred embodiment, the internal threaded part 65 contains steel. Thus it enables a high stability and secure connection with an external thread.

According to a preferred embodiment, the contact track 60 is formed as a bent part. This enables an advantageous one-piece form of the preferably curved or bent contact track 60.

According to a preferred embodiment, the second section 62 and the internal threaded part 65 are formed in two pieces and firmly connected to each other. This enables the use of two differently manufactured sub-components.

According to a preferred embodiment, the internal thread 66 of the internal threaded part 65 is axially aligned to enable the screwing in of a screw part from the axial direction. This facilitates the manufacture and has proved to be advantageous.

According to a preferred embodiment, the winding wire contact element 50 contains a base plate 52 and a bridge element 54 with a bend; at least one section 36A of at least one winding wire 36 is arranged between the bridge element 54 and the base plate 52. Hereby, a very secure and process-reliable electrical connection can be achieved.

According to a preferred embodiment, the internal threaded part 65, and the coils 38A, 38B, 38C, 38D wound from at least one winding wire 36, are spaced from each other. Hereby, a screw can be screwed into the internal threaded part 65 without the danger of the coils being destroyed.

Naturally, within the scope of the present invention, multiple variations and modifications are possible.

The invention claimed is:

1. An electronically commutated motor (10) comprising:
   a rotor (20) having an arrangement of permanent magnets (22), said rotor (20) defining a rotation axis (24) of the motor (10),
   a stator (30) having a bundle of laminations (32) and a winding arrangement (34), said bundle of laminations (32) having, at least at one axial end (32') thereof, an insulating body (41), said winding arrangement (34) including a plurality of coils (38A, 38B, 38C, 38D) that are wound from at least one winding wire (36),
   at least one winding wire contact element (50), which is attached to the insulating body (41) and is mechanically and electrically conductive, connected to at least one section (36A) of at least one winding wire (36),
   at least one contact track (60) with a first section (61), a second section (62) and a third section (63),
   wherein:
   the first section (61) is mechanically and electrically conductively connected to the winding wire contact element (50);
   in the second section (62), an internal threaded part (65) with an internal thread (66) is arranged to enable electrical connection of the winding arrangement (34) to an associated voltage source;
   a third section (63) electrically conductively interconnects the first section (61) with the second section (62);
   the stator (30) is formed ring-shaped, the winding wire contact element (50) is arranged in a first angle range of the stator (30) and the internal threaded part (65) is arranged in a second angle range of the stator (30), said first angle range and said second angle range being non-overlapping with respect to each other;
   the internal threaded part (65) contains an external surface (68) and the insulating body (41) contains at least one flexible holding element (42A, 42B) which is formed in such a way that it flexibly holds the internal threaded part (65) to its external surface (68).

2. Motor according to claim 1, wherein the contact track (60) contains at least one partial section (70A, 70B) in the second section (62) which is secured to the insulating body (41) and, in cooperation with the insulating body (41), limits a movement of the second section (62) of the contact track (60) in a direction facing toward the bundle of laminations (32).

3. Motor according to claim 2 wherein
the contact track (60) in the second section (62) contains at least a second partial section (71A, 71B) which is fixed at the insulating body (41) and, in cooperation with the insulating body (41), limits a movement of the second section (62) of the contact track (60) into a direction facing away from the bundle of laminations (32).

4. Motor according to claim 3, wherein at least one first partial section (70A, 70B) and at least one second partial section (71A, 71B) are connected to each other.

5. Motor according to claim 2, wherein the second section (62) of the contact track (60) and the internal threaded part (65) are formed as two pieces which are firmly connected to each other.

6. Motor according to claim 2, wherein the internal thread (66) of the internal threaded part (65) is axially aligned, to enable the screwing-in of a screw part from an axial direction.

7. Motor according to claim 2,
wherein the winding wire contact element (50) contains a base plate (52) and a bridge element (54) with a bend; and
wherein at least one section (36A) of at least one winding wire (36) is arranged between the bridge element (54) and the base plate (52).

8. Motor according to claim 2, wherein the internal threaded part (65), and the coils (38A, 38B, 38C, 38D) wound from at least one winding wire (36), are spaced from each other.

9. Motor according to claim 1,
wherein the winding wire contact element (50) contains a flat winding wire contact element section (51) and
wherein the first section (61) of the contact track (60) has a flat contact track section (69) and
wherein the winding wire contact element section (51) and the contact track section (69) are connected to each other flatly via a welded connection.

10. Motor according to claim 1, wherein the contact track (60) contains copper.

11. Motor according to claim 1, wherein the winding wire contact element (50) contains copper.

12. Motor according to claim 1, wherein the internal threaded part (65) contains steel.

13. Motor according to claim 1, wherein the contact track (60) is formed as a bent part.

* * * * *